(12) United States Patent
Tan (10) Patent No.: US 10,681,066 B2
(45) Date of Patent: Jun. 9, 2020

(54) INTELLIGENT CYBER-SECURITY HELP NETWORK FOR STUDENT COMMUNITY

(71) Applicant: William Harrison Tan, Great Falls, VA (US)

(72) Inventor: William Harrison Tan, Great Falls, VA (US)

( * ) Notice: Subject to any disclaimer, the term of this patent is extended or adjusted under 35 U.S.C. 154(b) by 310 days.

(21) Appl. No.: 15/903,003

(22) Filed: Feb. 22, 2018

(65) Prior Publication Data

US 2018/0183822 A1 Jun. 28, 2018

(51) Int. Cl.
| | |
|---|---|
| *H04L 29/06* | (2006.01) |
| *H04L 29/08* | (2006.01) |
| *H04L 12/58* | (2006.01) |
| *G06Q 50/20* | (2012.01) |
| *G06Q 10/10* | (2012.01) |
| *G09B 5/02* | (2006.01) |
| *G09B 19/00* | (2006.01) |

(52) U.S. Cl.
CPC ......... *H04L 63/1416* (2013.01); *G06Q 10/10* (2013.01); *G06Q 10/107* (2013.01); *G06Q 50/20* (2013.01); *G09B 5/02* (2013.01); *H04L 51/04* (2013.01); *H04L 51/12* (2013.01); *H04L 63/1433* (2013.01); *H04L 67/104* (2013.01); *G09B 19/0053* (2013.01)

(58) Field of Classification Search
CPC . H04L 63/1416; H04L 63/1433; H04L 51/04; H04L 51/12; H04L 67/101; G06Q 10/107; G06Q 10/10; G06Q 50/20; G09B 5/02; G09B 19/0053
See application file for complete search history.

(56) References Cited

U.S. PATENT DOCUMENTS

2002/0129221 A1 * 9/2002 Borgia .............. G06Q 10/06311
     712/1
2017/0214709 A1 * 7/2017 Maestas .............. H04L 63/1433

* cited by examiner

*Primary Examiner* — Khoi V Le (57) ABSTRACT

A method and system for an online help network containing a server and a plurality of terminals are disclosed. The method includes registering users of the plurality of terminals, wherein the plurality of terminals form a peer-to-peer network over which the plurality of terminals communicate with one another without going through the server; determining a question from a user of one of the terminals and a target recipient as one of the server and the peer-to-peer network; receiving an answer to the question from the target recipient; obtaining a risk detection category from the user; obtaining one or more detection patterns associated with the risk detection category; based on the one or more detection patterns, detecting a cyber risk on the terminal of the user with the risk detection category; and prompting the user of the cyber risk detected on the terminal of the user.

14 Claims, 8 Drawing Sheets

INTELLIGENT CYBER-SECURITY HELP NETWORK FOR STUDENT COMMUNITY

FIELD OF THE INVENTION

The present disclosure relates to network technologies and, more particularly, to methods and systems for providing online help on cyber security for students.

BACKGROUND

Nowadays, cyber security is one of the most important tasks for companies, government organizations, universities, and other organizations. These organizations spend a large amount of resource to safeguard possible cyber-attacks over the ubiquitous online networks. Although cyber-attacks at the personal level are not the top concern of cyber security experts and cyber security industry, any such attack can cause great damage or trouble to the individuals targeted by such cyber-attacks.

Due to young age and less experience in handling malicious attacks, students are generally vulnerable to many forms of cyber-attacks, such as malware, phishing, password attacks, malvertising, rogue software, fake person, etc. On the other hand, many students spend a large amount of time on social network websites, such as chat rooms and other online communities, and often lack the vigilance to tell people with bad intentions.

Thus, for the student community, a different approach may be needed to help the students to stay safe in this Internet time. The disclosed method and system are directed to solve one or more problems set forth above and other problems.

BRIEF SUMMARY OF THE DISCLOSURE

One aspect of the present disclosure provides a method for an online help network containing a server and a plurality of terminals. The method includes: registering users of the plurality of terminals, wherein the plurality of terminals form a peer-to-peer network over which the plurality of terminals communicate with one another without going through the server; determining a question from a user of one of the terminals and a target recipient as one of the server and the peer-to-peer network; receiving an answer to the question from the target recipient; obtaining a risk detection category from the user; obtaining one or more detection patterns associated with the risk detection category; based on the one or more detection patterns, detecting a cyber risk on the terminal of the user with the risk detection category; and prompting the user of the cyber risk detected on the terminal of the user.

Another aspect of the present disclosure provides a system for non-transitory computer-readable storage medium. The non-transitory computer-readable storage medium contains computer-executable instructions for, when executed by one or more processors, performing a method for an online help network. The online help network includes a server and a plurality of terminals, and the method includes: registering users of the plurality of terminals, wherein the plurality of terminals form a peer-to-peer network over which the plurality of terminals communicate with one another without going through the server; determining a question from a user of one of the terminals and a target recipient as one of the server and the peer-to-peer network; receiving an answer to the question from the target recipient; obtaining a risk detection category from the user; obtaining one or more detection patterns associated with the risk detection category; based on the one or more detection patterns, detecting a cyber risk on the terminal of the user with the risk detection category; and prompting the user of the cyber risk detected on the terminal of the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. Further, the described embodiments are some but not all of the embodiments of the present invention. Based on the disclosed embodiments, persons of ordinary skill in the art may derive other embodiments consistent with the present disclosure, all of which are within the scope of the present invention.

In the present disclosure, a user terminal, a terminal, or a terminal device is used interchangeably to refer to any computing device that may communicate with another computing device. Exemplary terminals may include laptop computers, smartphones, tablet computers, etc.

Figure 1:
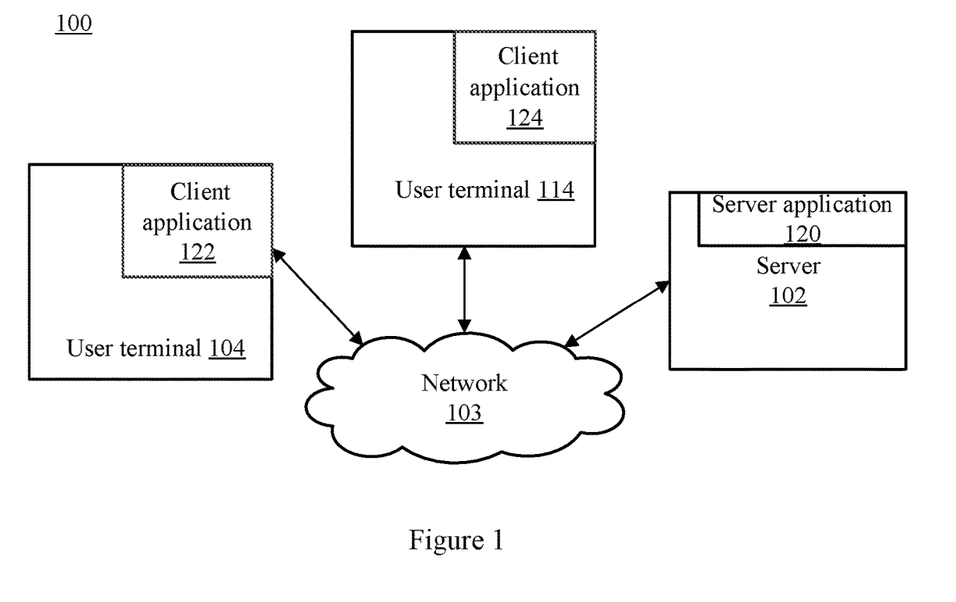
FIG. 1 illustrates an exemplary online computer environment incorporating certain disclosed embodiments.

FIG. 1 illustrates an exemplary online computer environment 100 incorporating certain disclosed embodiments. As shown in FIG. 1, environment 100 may include user terminals 104 and 114, a network 103, and a server 102. The network 103 may include any appropriate type of communication network for providing network connections to the user terminals 104 and 114, and the server 102. For example, network 103 may include the Internet, LAN (Local Area Network), or other types of computer networks or telecommunication networks, either wired or wireless.

Server 102, as used herein, may refer to one or more server computers configured to provide certain server functionalities, such as storing or processing data related to users, user online activities, user applications, and user terminal data flows and data patterns, etc. For example, the server 102 may authenticate any user accessing the services provided by the server 102. The server 102 may also include one or more processors to execute computer programs. Although only one server is shown, any number of servers can be included. The server 102 may operate in a cloud or non-cloud computing environment.

User terminals 104 and 114 may include any appropriate type of network computing devices, such as PCs, tablet computers, smartphones, network TVs, etc. User terminals 104 and 114 may also include various applications, such as email, social network chat rooms, web browsing, online searching, etc. Specifically, user terminals 104 and 114 may include a cyber security help application 120 and 122 (e.g., a client application), respectively. The cyber security help application, as used herein, may include any appropriate software application, hardware application, or a combination thereof to achieve certain client functionalities for providing cyber security help services. For example, the cyber security help application 120 may be a virtual assistant application or any other appropriate application running on the user terminal to facilitate a user to safeguard the user's cyber activities. Although only two user terminals and cyber security help applications are shown in FIG. 1, any number of user terminals and cyber security help applications may be included in the environment 100.

Figure 2:
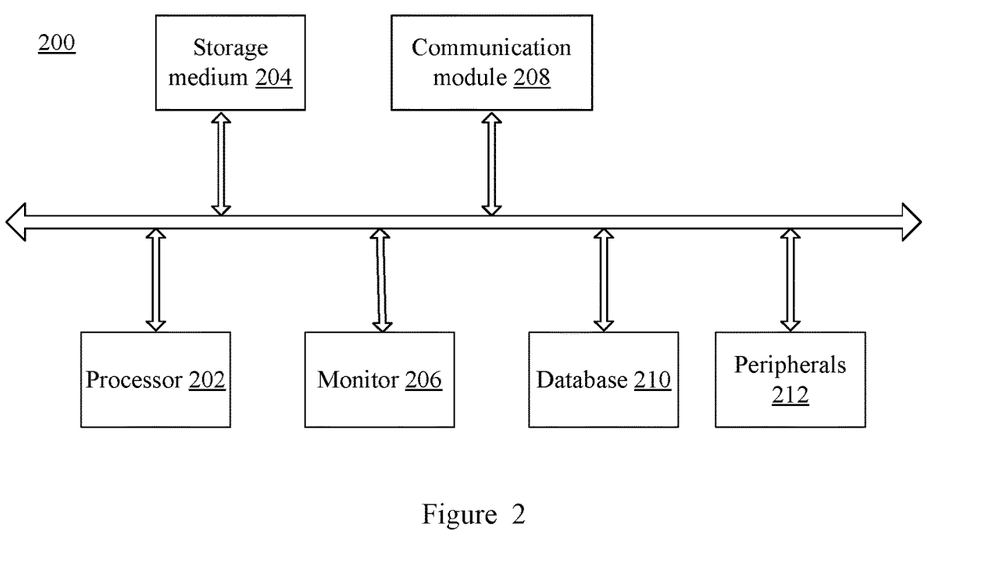
FIG. 2 illustrates a block diagram of an exemplary computer system consistent with the disclosed embodiments.

The user terminal 104 or 114 and/or the server 102 may be implemented on any appropriate computing platform. FIG. 2 illustrates a block diagram of an exemplary computer system 200 capable of implementing user terminal 104 or 114 and/or the server 102.

As shown in FIG. 2, computer system 200 may include a processor 202, storage medium 204, a monitor 206, a communication module 208, a database 210, and peripherals 212. Certain devices may be omitted, and other devices may be included.

Processor 202 may include any appropriate processor or processors. Further, processor 202 can include multiple cores for multi-thread or parallel processing. Storage medium 204 may include memory modules, such as Read-only Memory (ROM), Random Access Memory (RAM), flash memory modules, and erasable and rewritable memory, and mass storages, such as CD-ROM, U-disk, and hard disk, etc. Storage medium 204 may store computer programs for implementing various processes, when executed by processor 202. Monitor 206 may include any appropriate display for displaying data processed by the processor 202, such as an LCD display screen or a touch screen, etc.

Further, peripherals 212 may include I/O devices such as a keyboard and a mouse. Communication module 208 may include network devices for establishing connections through the network 103. Database 210 may include one or more databases for storing certain data and for performing certain operations on the stored data, such as database searching.

In operation, the server 102 and terminals may interact with one another to perform various processes for providing online help on cyber security for students. To implement these processes, the server 102 may include a server application 120, and the terminal 104 may include a client application 122 and the terminal 114 may include a client application 124. A client application may communicate with the server application or may communicate with another client application to implement the processes on the corresponding terminal. For example, FIG. 3 illustrates an exemplary client application 122.

Figure 3:
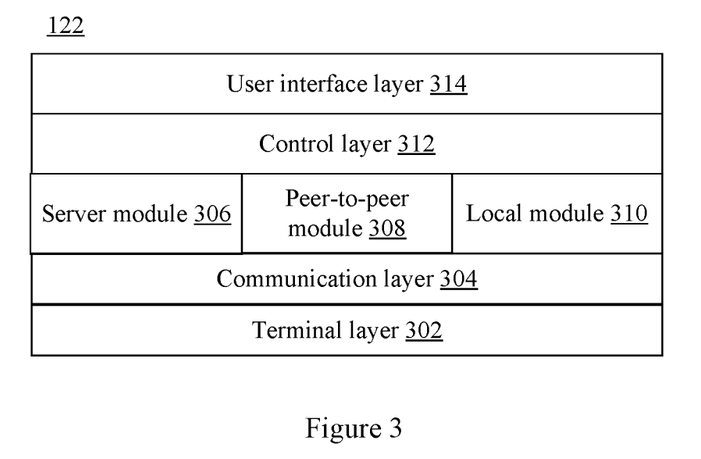
FIG. 3 illustrates an exemplary client application consistent with the disclosed embodiments.

As shown in FIG. 3, client application 122 may include a terminal layer 302, a communication layer 304, a server module 306, a peer-to-peer module 308, a local module 310, a control layer 312, and a user interface layer 314. Certain components may be omitted, and other components may be added. The server module 306, the peer-to-peer module 308, and the local module 310 may also be considered as an application layer.

The terminal layer 302 may provide various functions to interact with the terminal 104, such as interacting with the Operating System and/or other applications on the terminal 104. For example, the terminal layer 302 may include network functions to provide data connection to the Internet, or a data analyzer to analyze the data flow of the network interface of the terminal 104.

The communication layer 304 may provide various communication functions, such as sending and receiving messages from the server 102, the terminal 114, and/or network 103. The communication layer 304 may use the terminal layer 302 to perform actual data transmission and reception.

The application layer (e.g., the server module 306, the peer-to-peer module 308, and the local module 310) may provide the functionalities associated with online help on cyber security for students. For example, the server module 306 may interact with the server 102 to provide various functionalities together with the server 102.

The peer-to-peer module 308 may interact with other terminals to provide various functionalities together with other terminals. That is, the peer-to-peer module 308 may interact with peer-to-peer modules of other terminals to form a peer-to-peer network, and terminals on the peer-to-peer network may be communicate with one another without going through the server. Further, the local module 310 may provide various functionalities locally to the student user of the terminal 104.

Further, the control layer 312 may provide control functionalities to configure and control the operation of other layers and modules to implement the various processes and functionalities. The user interface layer 314 may provide an interface to the user of the terminal 104 to view the various texts, images, videos, and/or audio displayed or presented to the user by the client application 122.

In one embodiment, the control layer 312 and the user interface layer 314 may be integrated into a voice-activated virtual assistant to take command from the user and provide audio and/or other forms of output to the user.

Figure 4:
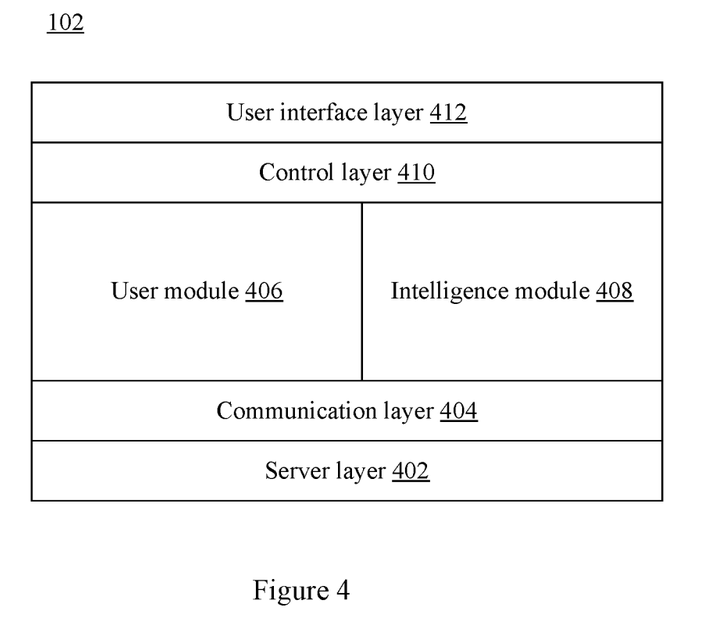
FIG. 4 illustrates an exemplary server application consistent with the disclosed embodiments.

FIG. 4 illustrates an exemplary server application 120. As shown in FIG. 4, the server application 120 may include a server layer 402, a communication layer 404, a user module 406, an intelligence module 408, a control layer 410, and a user interface layer 412. Certain components may be omitted, and other components may be added. The user module 406 and the intelligence module 408 may be considered as an application layer.

The server layer 302 may provide various functions to interact with the server 102, such as interacting with the Operating System and/or other applications on the server 102. For example, the server layer 402 may include network functions to provide data connection to the Internet.

The communication layer 404 may provide various communication functions, such as sending and receiving messages from the terminal 104, the terminal 114, and/or network 103. The communication layer 404 may use the server layer 402 to perform actual data transmission and reception.

The application layer (e.g., the user module 406 and the intelligence module 408) may provide the functionalities associated with online help on cyber security for students. For example, the user module 406 may interact with terminals to provide various user management functionalities, such as user registration, authentication, and authorization. The intelligence module 408 may perform backend server logics to provide intelligence to the online help functions to predict, monitor, and/or prevent cyber security risks to the student users, as well as to answer questions raised by the student users in a knowledge-based service.

Further, the control layer 410 may provide control functionalities to configure and control the operation of other layers and modules to implement the various processes and functionalities. The user interface layer 412 may provide an interface to the user of the server 102 to view the various texts, images, videos, and/or audio displayed or presented to the user by the server application 102.

Figure 5:
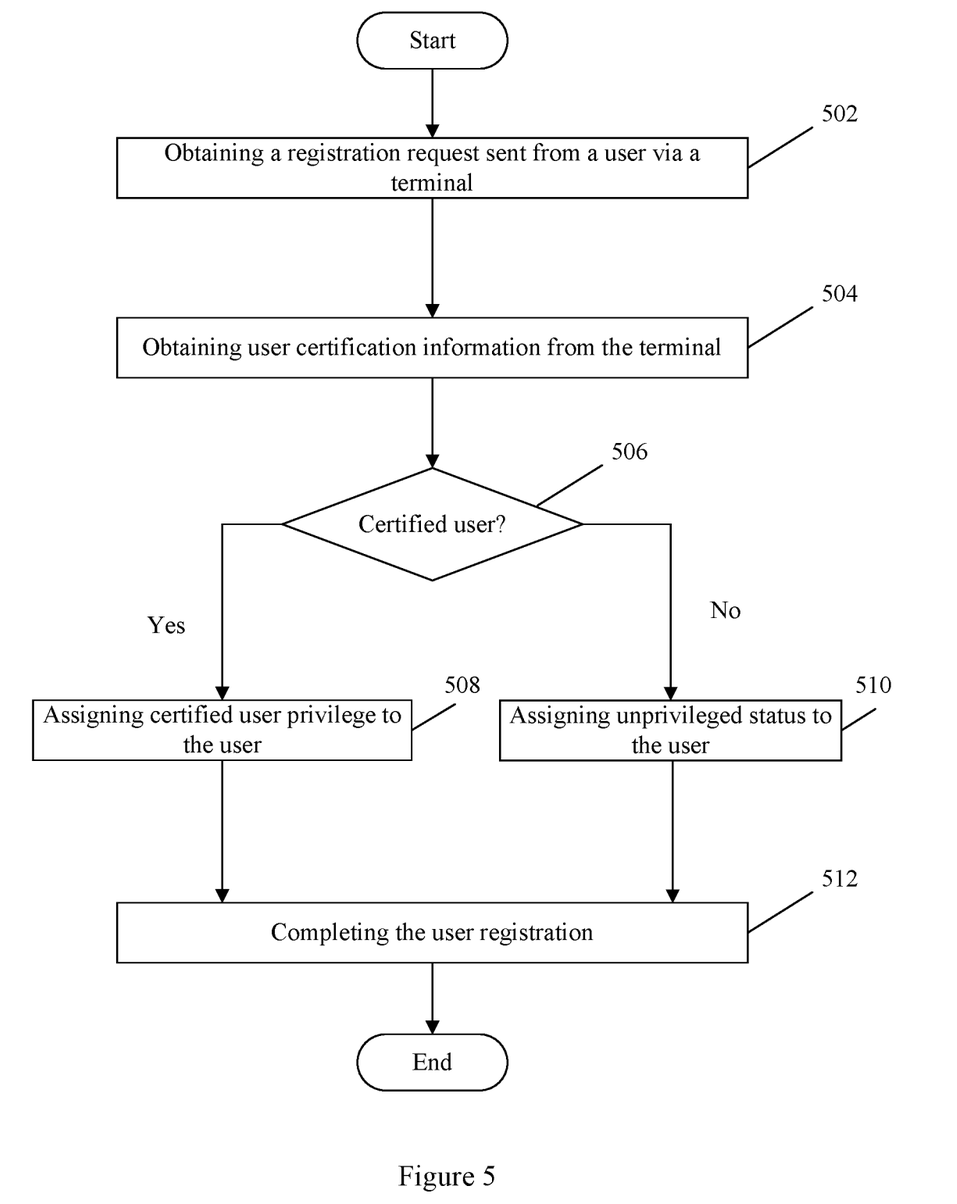
FIG. 5 illustrates an exemplary user registration process consistent with the disclosed embodiments.

FIG. 5 illustrates an exemplary user registration process performed by the server 102 and a terminal for a user. As shown in FIG. 5, at the beginning of the process, a server (e.g., the server application or the processor of the server) may receive a user registration request from a user on a terminal (502).

Specifically, a user may use the client application of the terminal to send out a request for registration. The request may contain certain information to identify the user as well as other information associated with the user to facilitate the user registration. The terminal may further determine the address of the server and send the request to the server.

After the server receives the user registration request, the server may further obtain user certification information from the user and/or terminal (504). For example, the server may obtain user certification information contained in the user request, such as user identifier, user security credential, user location, terminal identifier, and/or routing information, etc. The server may also send a response to the terminal in response to the user registration request to ask for more information, if such information is not contained in the user request.

The user certification information may depend on the user certification algorithm used by the server. In one embodiment, the user certification algorithm may be based on whether the terminal or an intermediate server sending the user request for the terminal is pre-authorized. For example, when the terminal is a pre-authorized terminal located within a known elementary, middle, or high school, the terminal is considered as pre-authorized. Or if there is an intermediate server sends the user request for the terminal, and the intermediate server is pre-authorized as being located within a known elementary, middle, or high school, the terminal is considered as pre-authorized.

In another embodiment, the user certification algorithm may be based on location of the terminal. For example, the location of the terminal may be obtained (e.g., the GPS coordinates), and the location of the terminal is compared with a database of school locations, which contains location information of all elementary, middle, and/or high schools known to the server. When the location of the terminal matches the location information in the database or the difference is within an allowable range, the terminal may be considered as authorized.

In another embodiment, the user certification algorithm may be based on identification information of the user. For example, the user request may include user security credential, such as user name and password pair, or a private or public security key. Further, the biometrics of the user may be automatically obtained by the terminal and sent to the server, such as finger prints, retina scan image, or a 3D face scan, and the server may perform analysis to determine whether the user is authorized based on the biometrics. Other certification information may also be used.

Further, based on the obtained certification information, the server may determine whether the user is a certified user (506). When the server determines that the user is a certified user, i.e., the user is authorized (506; Yes), the server may assign a certified user privilege to the user (508). For example, the user with the certified user privilege may be able to access all services provided by the online help network. On the other hand, when the server determines that the user is not a certified user, i.e., the user is not authorized (506; No), the server may assign an unprivileged status to the user (510). With the unprivileged status, the user may only access public services, such as public available information, educational materials, etc.

Further, the server may complete the user registration (512). For example, the server may store user information in a centralized database or in a cloud-based database for user authentication and authorization when the user accesses the services provided by the online help network.

Figure 6:
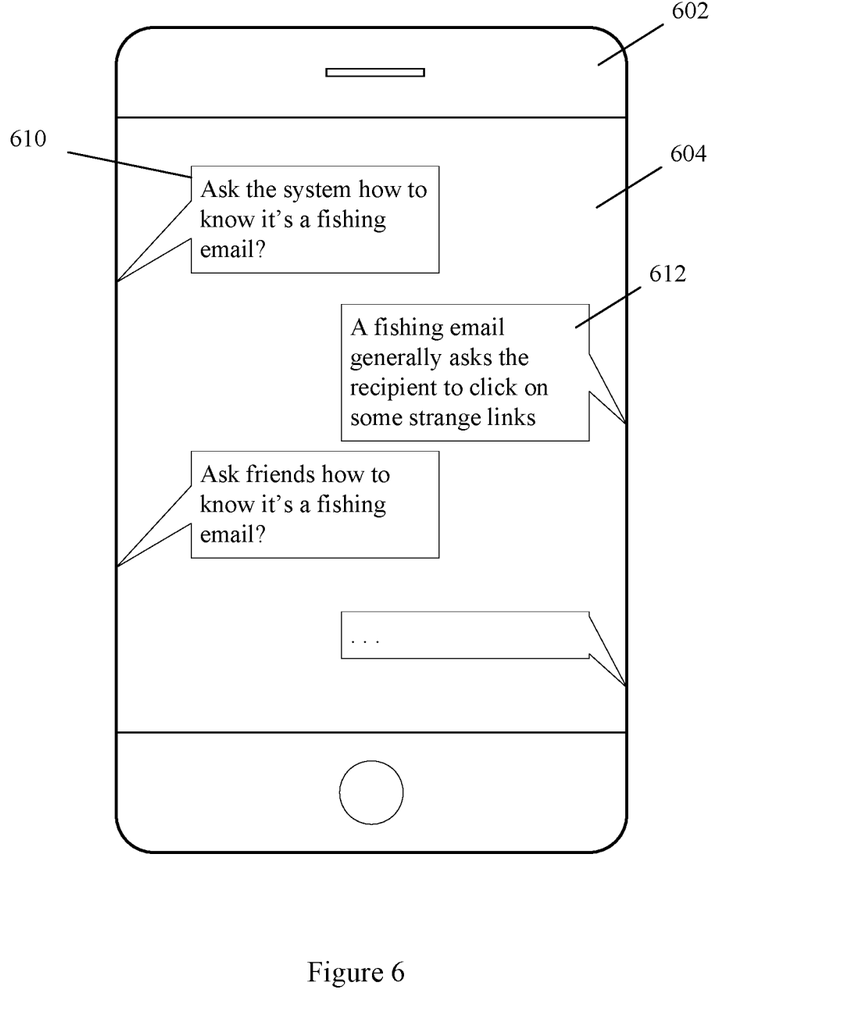
FIG. 6 illustrates an exemplary user interface for the knowledge-based service consistent with the disclosed embodiments.

More specifically, the online help network may provide a series of services for the student user to understand, detect, and prevent cyber risks. For example, a knowledge-based service may be provided. FIG. 6 illustrates an exemplary user interface for the knowledge-based service.

As shown in FIG. 6, a user may use terminal 602 to access the knowledge-based service provided by the online help network. The terminal 602 may include a display screen 604 for displaying a user interface. After the user uses the terminal 602 to complete the user registration and the online help network (e.g., the server) authenticates and/or authorizes the user, the user can access services from the online help network.

In one embodiment, the user may invoke a voice-activated virtual assistant to enter a command or to enter the command by keyboard or touch screen input. The input is shown in the input box 610. For example, if the user receives a suspicious email and wants to know whether this email is a phishing email, the user may ask how to know if an email is a phishing email.

The terminal 602 (e.g., the client application or the processor of the terminal 602) may receive the user input and interpret the user's command. After the terminal 602 determines that the user is to ask a question, the terminal 602 may determine which entity is to provide an answer to the user. For example, if the user states to "ask the system" with the question, the terminal 602 may send the question to the server to provide an answer back to the user, as shown in output box 612, which may be voice, text, or other type of output.

In answer the user's question, after receiving the question from the terminal, the server may search an internal database for an answer to the question, or the server may search the Internet to find more appropriate answer. Alternatively, the server may obtain a plurality of answers from both the internal database as well as the Internet, rank the plurality of answers, and select a best answer to be sent back to the terminal.

If the user states to "ask friend" with the question, the terminal 602 may send the question to a peer via the peer-to-peer module. That is, other users participating a peer-to-peer network may be prompted that there is a question needs to be answered, and the user willing to answer the question may accept the question and provides the answer.

Figure 7:
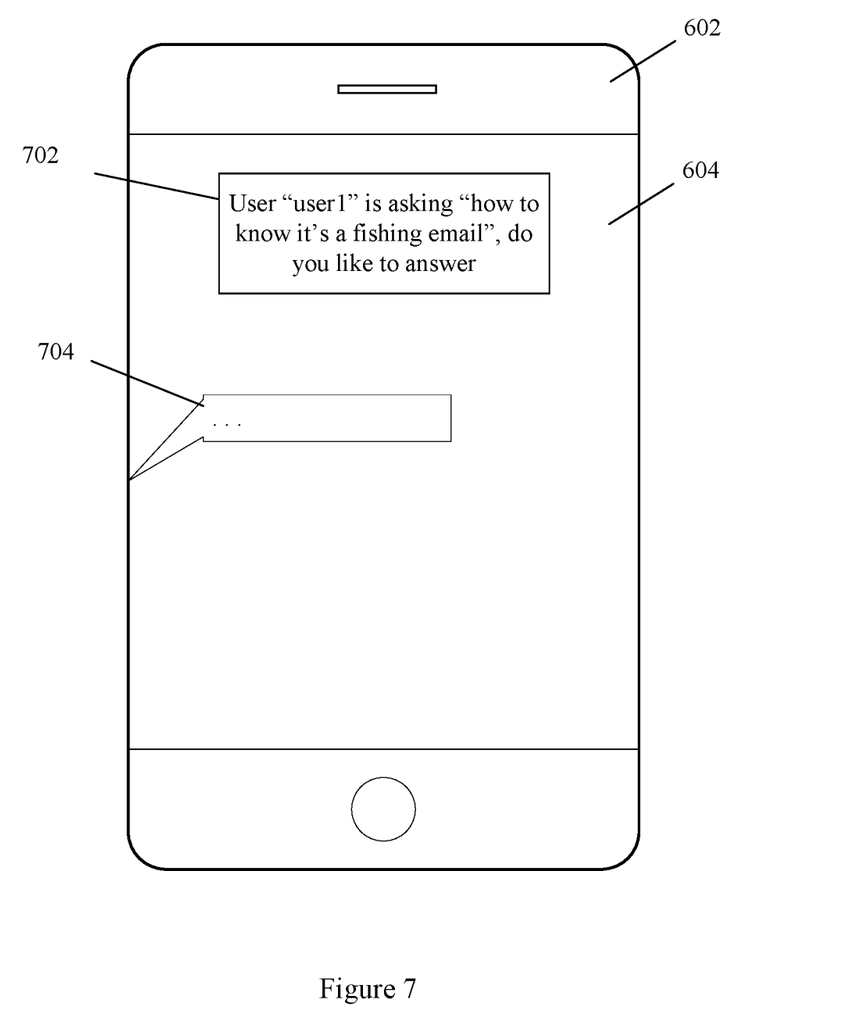
FIG. 7 illustrates an exemplary user interface for prompting a peer of the user consistent with the disclosed embodiments.

For example, as shown in FIG. 7, a prompt box may appear on a user participating the peer-to-peer network to prompt that user that a user identified as "user 1" asked a question, and whether that user would like to answer. If that user elects to answer the question, that user can click on the message to answer the question, as shown in input box 704. After that user answers the question, the answer will be shown in the display screen of the user asking the question, such as output box 612 shown in FIG. 6.

Figure 8:
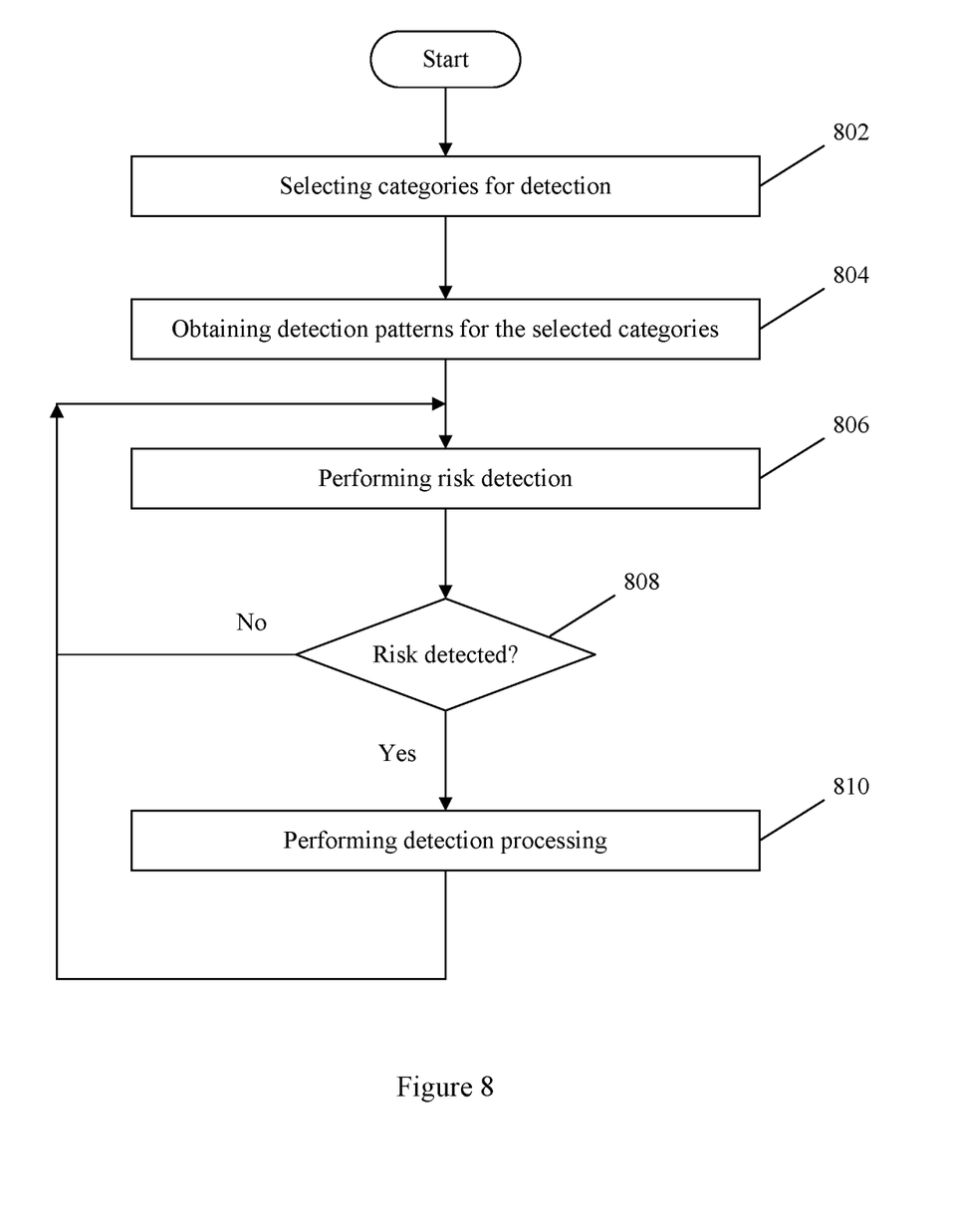
FIG. 8 illustrates an exemplary detection process consistent with the disclosed embodiments.

In certain embodiments, the online help network also provide a detection process for detecting cyber risks on the terminal of the user. FIG. 8 shows an exemplary detection process consistent with the disclosed embodiments.

As shown in FIG. 8, at the beginning, a user may select categories of cyber risks for detection on the terminal (802). For example, the user may select email for detection, or may select instant chat for detection. The user may also select images for detection, or may select generic data for detection. Further, the user may also select virus or intrusion detection, etc. Other categories may also be included, and the user may select one or more categories to be detected for cyber risks.

After the user selects the detection categories, the terminal may send the selected detection categories to the server, and the server may obtain detection patterns for the selected detection categories (804). The server may obtain corresponding detection patterns from its own database or from other sources. For example, for email detection, the server may obtain certain textual patterns for email risk detection, such as textual patterns asking the recipient to click on an embedded link, to download certain file, to meet in person, to log in user's accounts, or to provide sensitive information, etc. The server may also obtain logical patterns for email risk detection, such as inconsistent links in the email, inconsistent email addresses in the email, and/or similar emails from completely different email addresses, etc.

For chat detection, the server may also obtain textual patterns for online chat risk detection, such as textual patterns asking student user's real name, age, residence, sex, or other sensitive and personal information, or asking the student user to meet offline, etc. The server may also obtain logical patterns for online chat risk, such as inconsistent personal information offered, inconsistent behavior during the chat session or during a series of chat sessions, etc.

For image detection, the server may obtain image patterns for image risk detection, such as restricted image patterns, pornographic image patterns, etc. For virus or intrusion detection, the terminal may work with virus or intrusion detection applications on the terminal to perform the virus or intrusion related to cyber risks.

For generic data detection, a plurality of data patterns may be created to correspond certain risky data without considering the specific applications, and such patterns may be compared directly with data received by the terminal without interpretation by the destination applications. The data patterns may be plain data, or may be signatures of plain data, such as a hash of the plain data. The server may obtain the data patterns if the generic data detection is selected.

After obtaining the patterns for the selected detection categories, if the terminal does not have the patterns, the server may send the patterns to the terminal. Further, the terminal can start risk detection based on the patterns (806). That is, the terminal may analyze the incoming data to determine whether any data matches any of the patterns.

For example, for emails, the client application on the terminal may analyze the emails, both newly received emails and the stored emails, to detect any email textual pattern or logic pattern of any cyber risk. For online chat, the client application may analyze the chat data, both current chat data (texts, voice, etc.) and the chat record, to detect any chat textual pattern or logic pattern of any cyber risk. For generic data patterns, the client application of the terminal may intercept data from the network interface of the terminal to receive data to detect any data pattern of cyber risk. Other types of detection may also be performed similarly.

Figure 9:
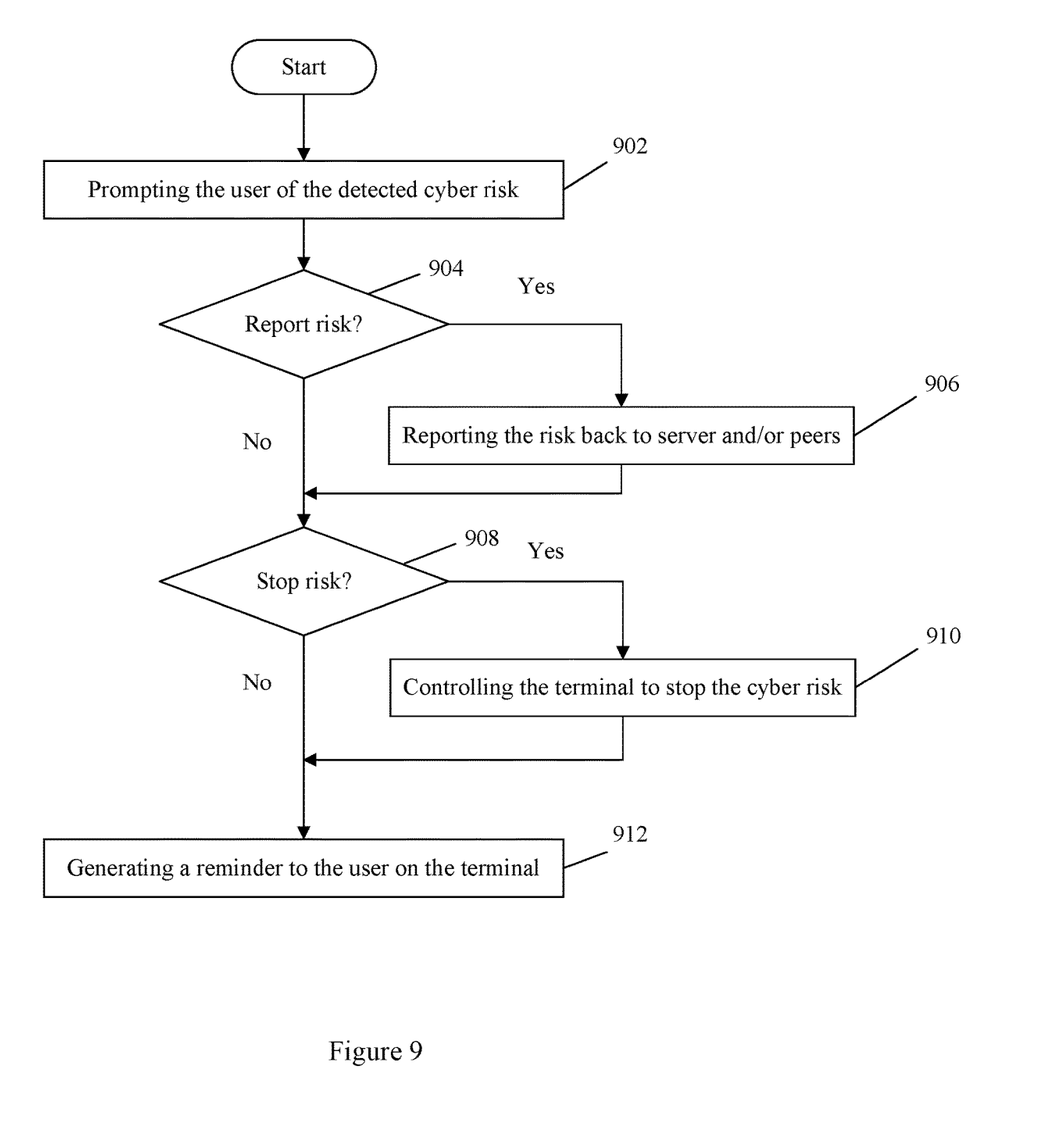
FIG. 9 illustrates an exemplary process for performing detection processing consistent with the disclosed embodiments.

Further, based on the risk detection, the terminal and/or the server may determine whether any cyber risk is detected (808). If the terminal/server determines that there is no detection of any cyber risk (808; No), the detection process continues to perform risk detection (806). On the other hand, if the terminal/server determines that certain cyber risk(s) is detected (808; Yes), the terminal/server may perform detection processing based on the detected cyber risks (810). FIG. 9 shows an exemplary process for performing detection processing consistent with the disclosed embodiments.

As shown in FIG. 9, after the cyber risk(s) is detected, for each risk, the user is prompted for the detected cyber risk (902). For example, the terminal (e.g., the client application) may display a dialog box on the display screen of the terminal to prompt the user of the detected cyber risk and/or generate an audible message to notify the user of the detected cyber risk.

Further, the terminal may determine whether to report the detected cyber risk (904). When the terminal determines to report the detected cyber risk (904; Yes), the terminal may report the detected risk(s) to a report recipient, such as the server (906). The detected cyber risk may be reported in a plurality reporting levels, which may be configured by the user of the terminal. For example, the user may configure the client application of the terminal to report any detected cyber risk to the server or to report only specific detected cyber risks to the server. The user may also configure the client application of the terminal to report the detected cyber risk with real name and/or other user information, or to report the detected cyber risk anonymously. Further, the user may also configure the client application of the terminal to report to certain peers over the peer-to-peer network, or to report to selected school network systems.

After the reporting or if the terminal determines not to report the detected cyber risk (904; No), the terminal may determine whether to stop the detected cyber risk (908). When the terminal determines to stop the detected cyber risk (908; Yes), the client application may control the terminal to stop the detected cyber risk (910). That is, the client application may try to stop the detected cyber risk automatically. For example, the client application may prevent any response to an email address with detected cyber risk from being sent out of the terminal, block any website link with detected cyber risk from being accessed from the terminal, freeze any configuration to user or administrative accounts, disconnect and block any live chat session with a chat entity having detected cyber risk, and/or temporarily disable or block the network interface with detected cyber risk. The user may also configure the client application to stop the detected cyber risk automatically or manually.

After stopping the detected cyber risk or if the terminal determines not to stop the detected cyber risk (908; No), the terminal may generate a reminder to the user on the terminal (912). Specifically, the terminal may generate a reminder to indicated that a cyber risk was detected against a particular application, such as the email application, the chat application, etc.

Figure 10:
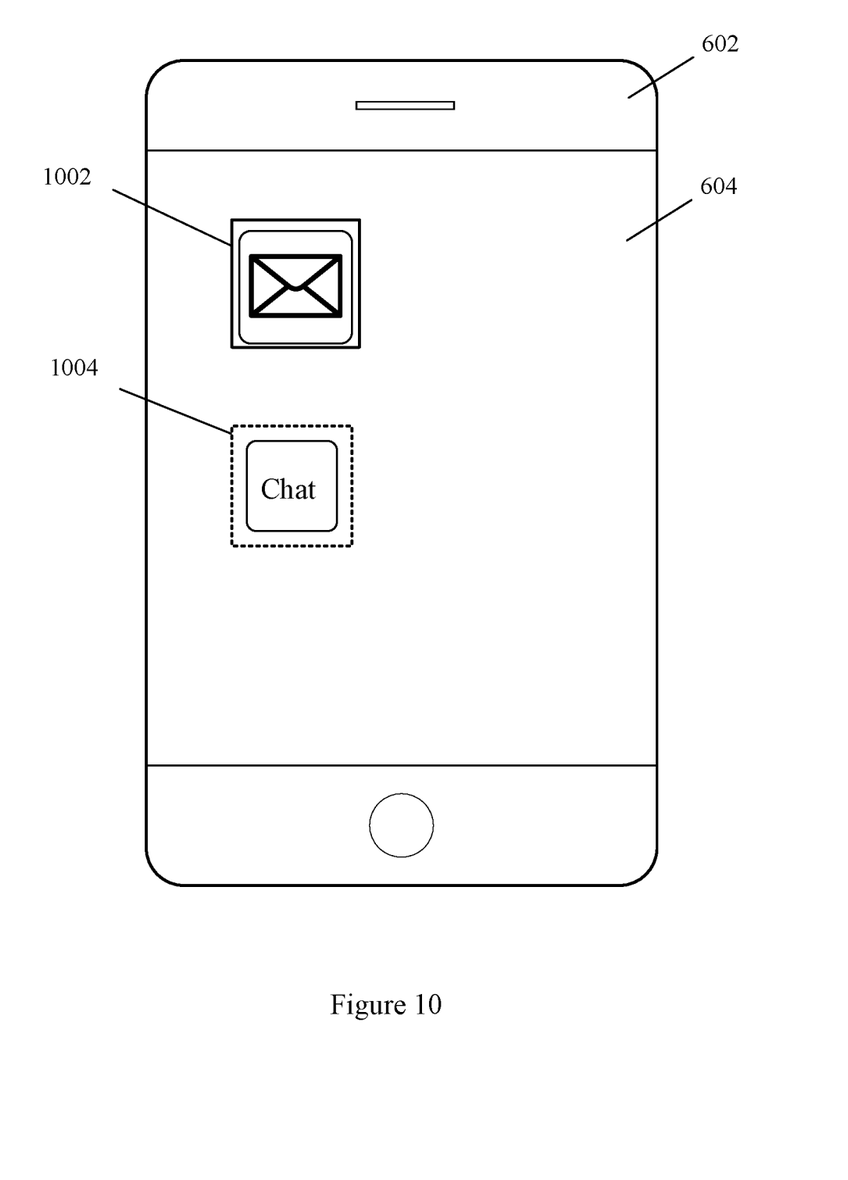
FIG. 10 illustrates exemplary reminders consistent with the disclosed embodiments.

FIG. 10 shows exemplary reminders on the email application and the chat application consistent with the disclosed embodiments.

As shown in FIG. 10, a cyber risk is detected on an email application, and a reminder 1002 is generated against the email application. The reminder 1002 may be a frame circling the icon of the email application and in a noticeable color, such as red or orange. Thus, the user may easily notice the detected cyber risk on the email application. Further, a cyber risk is also detected on a chat application, and a reminder 1004 is generated against the chat application. The reminder 1004 may be a blinking frame circling the chat application to indicate the detected cyber risk on the chat application. Other reminders may also be used.

By using the disclosed methods and systems, an intelligent cyber security help network may be provided for the student community. The online help network may be provided on a server and user terminals, and the student users may use the server or terminals of other users to access knowledge of the cyber security and answers to cyber risk questions. Further, the online help network may detect certain cyber risks on the user terminal to help the user understanding the ongoing cyber risks associated with applications on the user terminal, and may also stop the detected cyber risk automatically. Accordingly, the student user can be more familiar with the cyber security risks and can also be protected against the cyber risks.

What is claimed is:

1. A method for an online help network containing a server and a plurality of devices, comprising:
    registering users of the plurality of devices, wherein the plurality of devices form a peer-to-peer network over which the plurality of devices communicate with one another without going through the server;
    determining a question from a user of one of the devices and a target recipient as one of the server and the peer-to-peer network;
    receiving an answer to the question from the target recipient;
    obtaining a risk detection category from the user;
    obtaining one or more detection patterns associated with the risk detection category;
    based on the one or more detection patterns, detecting a cyber risk on the device of the user with the risk detection category;
    prompting the user of the cyber risk detected on the device of the user;
    determining whether to stop the cyber risk detected on the device of the user;
    controlling the device of the user to stop the cyber risk detected on the device of the user when it is determined to stop the cyber risk detected on the device of the user; and
    generating a reminder on the device of the user against the risk detection category as one of a frame with a noticeable color surrounding an icon of the risk detection category and a blinking frame surrounding the icon of the risk detection category.

2. The method according to claim 1, further comprising:
    determining whether to report the cyber risk detected on the device of the user; and
    when it is determined to report the cyber risk detected on the device of the user, reporting to at least one of the server and the peer-to-peer network.

3. The method according to claim 1, wherein registering a user of a device includes:
    receiving a user registration request from the user of the device, wherein the user registration request contains a user identifier and user certification information containing location information of the device;
    determine that the user is a certified user when a location of the device matches a location of a known elementary, middle, or high school; and
    registering the user with a certified user privilege.

4. The method according to claim 1, wherein the risk detection category includes an email application and a chat application.

5. The method according to claim 4, wherein obtaining one or more detection patterns associated with the risk detection category further includes:
    obtaining textual patterns and logic patterns for the email application, wherein the textual patterns include textual content asking the recipient to click on an embedded link, to download a certain file, to meet in person, to log in an account of the user, or to provide sensitive information, and the logic patterns include content reflecting inconsistent links in an email, inconsistent email addresses in the email, and similar emails from completely different email addresses.

6. The method according to claim 4, wherein obtaining one or more detection patterns associated with the risk detection category further includes:
    obtaining textual patterns and logic patterns for the chat application, wherein the textual patterns include textual content asking the user's real name, age, residence, sex, or other sensitive and personal information, or asking the user to meet offline, and the logic patterns include content reflecting inconsistent personal information offered, and inconsistent behavior during the chat session or during a series of chat sessions.

7. The method according to claim 4, wherein controlling the device of the user to stop the cyber risk further includes:
    preventing any response to an email address with detected cyber risk from being sent out of the device of the user; and
    disconnecting and blocking any live chat session with a chat entity having detected cyber risk.

8. A non-transitory computer-readable storage medium containing computer-executable instructions for, when executed by one or more processors, performing a method for an online help network containing a server and a plurality of devices, the method comprising:
    registering users of the plurality of devices, wherein the plurality of devices form a peer-to-peer network over which the plurality of devices communicate with one another without going through the server;
    determining a question from a user of one of the devices and a target recipient as one of the server and the peer-to-peer network;
    receiving an answer to the question from the target recipient;
    obtaining a risk detection category from the user;
    obtaining one or more detection patterns associated with the risk detection category;
    based on the one or more detection patterns, detecting a cyber risk on the device of the user with the risk detection category;
    prompting the user of the cyber risk detected on the device of the user;
    determining whether to stop the cyber risk detected on the device of the user;
    controlling the device of the user to stop the cyber risk detected on the device of the user when it is determined to stop the cyber risk detected on the device of the user; and
    generating a reminder on the device of the user against the risk detection category as one of a frame with a noticeable color surrounding an icon of the risk detection category and a blinking frame surrounding the icon of the risk detection category.

9. The non-transitory computer-readable storage medium according to claim 8, the method further comprising:
   determining whether to report the cyber risk detected on the device of the user; and
   when it is determined to report the cyber risk detected on the device of the user, reporting to at least one of the server and the peer-to-peer network.

10. The non-transitory computer-readable storage medium according to claim 8, wherein registering a user of a device includes:
   receiving a user registration request from the user of the device, wherein the user registration request contains a user identifier and user certification information containing location information of the device;
   determine that the user is a certified user when a location of the device matches a location of a known elementary, middle, or high school; and
   registering the user with a certified user privilege.

11. The non-transitory computer-readable storage medium according to claim 8, wherein the risk detection category includes an email application and a chat application.

12. The non-transitory computer-readable storage medium according to claim 11, wherein obtaining one or more detection patterns associated with the risk detection category further includes:
   obtaining textual patterns and logic patterns for the email application, wherein the textual patterns include textual content asking the recipient to click on an embedded link, to download a certain file, to meet in person, to log in an account of the user, or to provide sensitive information, and the logic patterns include content reflecting inconsistent links in an email, inconsistent email addresses in the email, and similar emails from completely different email addresses.

13. The non-transitory computer-readable storage medium according to claim 11, wherein obtaining one or more detection patterns associated with the risk detection category further includes:
   obtaining textual patterns and logic patterns for the chat application, wherein the textual patterns include textual content asking the user's real name, age, residence, sex, or other sensitive and personal information, or asking the user to meet offline, and the logic patters include content reflecting inconsistent personal information offered, and inconsistent behavior during the chat session or during a series of chat sessions.

14. The non-transitory computer-readable storage medium according to claim 11, wherein controlling the device of the user to stop the cyber risk further includes:
   preventing any response to an email address with detected cyber risk from being sent out of the device of the user; and
   disconnecting and blocking any live chat session with a chat entity having detected cyber risk.

* * * * *